United States Patent
Chen

(10) Patent No.: US 10,151,140 B2
(45) Date of Patent: Dec. 11, 2018

(54) ONE-WAY DRIVING MECHANISM FOR CORDLESS WINDOW BLIND

(71) Applicant: Chin-Fu Chen, Taichung (TW)

(72) Inventor: Po-Yu Chen, Taichung (TW)

(73) Assignee: Chin-Fu Chen, Taichung (TW)

( * ) Notice: Subject to any disclaimer, the term of this patent is extended or adjusted under 35 U.S.C. 154(b) by 0 days.

(21) Appl. No.: 15/410,459

(22) Filed: Jan. 19, 2017

(65) Prior Publication Data

US 2017/0321477 A1 Nov. 9, 2017

(30) Foreign Application Priority Data

May 9, 2016 (TW) .............................. 105114305 A

(51) Int. Cl.
*E06B 9/322* (2006.01)
*F16D 41/12* (2006.01)

(52) U.S. Cl.
CPC .............. *E06B 9/322* (2013.01); *F16D 41/12* (2013.01); *E06B 2009/3222* (2013.01); *E06B 2009/3225* (2013.01)

(58) Field of Classification Search
CPC .............. E06B 9/322; E06B 2009/322; E06B 2009/3225; F16D 41/12
See application file for complete search history.

(56) References Cited

U.S. PATENT DOCUMENTS

| | | | | |
|---|---|---|---|---|
| 3,486,597 A * | 12/1969 | Carlton | ................... | F16D 41/12 192/46 |
| 3,589,486 A * | 6/1971 | Kelch | ..................... | F16D 41/18 192/46 |
| 4,346,749 A * | 8/1982 | Singletary | ................. | E06B 9/90 160/301 |
| 5,088,581 A * | 2/1992 | Duve | ...................... | F16D 41/12 192/107 M |
| 5,287,950 A * | 2/1994 | Feathers | ............ | A62B 35/0093 188/187 |
| 6,571,853 B1 * | 6/2003 | Ciuca | ...................... | E06B 9/322 160/170 |
| 6,675,861 B2 * | 1/2004 | Palmer | .................... | E06B 9/322 160/170 |
| 7,025,107 B2 * | 4/2006 | Ciuca | ...................... | E06B 9/303 160/170 |
| 2016/0123447 A1 * | 5/2016 | Chen | ..................... | F16H 31/001 160/168.1 P |
| 2016/0230453 A1 * | 8/2016 | Chen | ...................... | E06B 9/322 |
| 2016/0230454 A1 * | 8/2016 | Chen | ...................... | E06B 9/322 |

* cited by examiner

*Primary Examiner* — Katherine W Mitchell
*Assistant Examiner* — Abe Massad
(74) *Attorney, Agent, or Firm* — Muncy, Geissler, Olds & Lowe, P.C.

(57) ABSTRACT

A one-way driving mechanism for a cordless window blind essentially includes two volute spring gears, which are meshed with each other, and a volute spring connected between the volute spring gears. The volute spring gears each meshes with a cord gear. Each of the cord gears is connected with a cord, which is encircled with a single loop by a clutch wheel. Each clutch wheel is provided therein with a position-securing member.

5 Claims, 5 Drawing Sheets

ONE-WAY DRIVING MECHANISM FOR CORDLESS WINDOW BLIND

BACKGROUND OF THE INVENTION

1. Technical Field

The present invention relates to cordless window blinds and more particularly to a one-way driving mechanism for a cordless window blind.

2. Description of Related Art

Window blinds can be divided by structure into two major types: corded window blind and cordless window blind. The corded type of window blind mainly utilizes a cord to vary the expansion height (i.e. lowering or raising the slats) of the window blind, while the cordless type of window bind utilizes manual power to pull or push the bottom rail, so that the slats can be lowered or raised.

It is known that Taiwan Patent No. 263877 and Patent No. 322458 both describe improvements made to the driving (lifting/lowering) mechanisms of window blinds. However, both of them are still structurally complicated and fail to secure the slats of the window blind in position satisfactorily.

BRIEF SUMMARY OF THE INVENTION

An objective of the present invention is to provide a one-way driving mechanism which is applicable to a cordless window blind, has a simple structure, and can properly secure the slats of the window blind.

To achieve the above objective, the present invention provides a one-way driving mechanism which includes a casing, a reeling unit, two cord units, and two one-way clutch units. The reeling unit has two volute spring gears and a volute spring. The two volute spring gears are rotatably provided in the casing and meshed with each other. The volute spring connects the two volute spring gears and can be wound around one of the two volute spring gears by the rotating of the volute spring gears. Each of the cord units has a cord gear and a cord. The two cord gears are rotatably provided in the casing and meshed with the volute spring gears respectively so that each cord gear can rotate along with the volute spring gear with which it meshes. Each of the cords is connected to the corresponding cord gear in such a way that the cord each can be wound around or unwound around the corresponding cord gear by the rotating of the corresponding cord gear. Each of the one-way clutch units has a clutch wheel and a position-securing member. Each clutch wheel is rotatably provided in the casing and is encircled with a single loop by the corresponding cord, so that the clutch wheel each can be rotated by the corresponding cord. Each of the clutch wheels has an internally toothed peripheral portion. Each of the position-securing members is fixedly provided in the casing and has an elastic arm and a ratchet tooth. The ratchet tooth is provided at one end of the elastic arm and has a one-way meshing relationship with the internally toothed peripheral portion of the corresponding clutch wheel.

According to the above, when a user pushes or pulls the bottom rail, which is connected to the slats of the window blind and further to raise or lower the slats, the elastic restoring force of the volute spring drives the cords to rotate the clutch wheels respectively. However, once the internally toothed peripheral portions of the clutch wheels mesh with the ratchet teeth of the position-securing members respectively, the cords are stopped by the friction generated from the corresponding clutch wheel, and the slats of the window blind are thus secured in position.

The structure, features, and methods of assembly or use of the one-way driving mechanism of the present invention will be described in more detail below. As a person of ordinary skill in the art would understand, the following detailed description and the specific embodiment disclosed herein serve illustrative purposes only and are not intended to be restrictive of the scope of the invention.

DETAILED DESCRIPTION OF THE INVENTION

Figure 1:
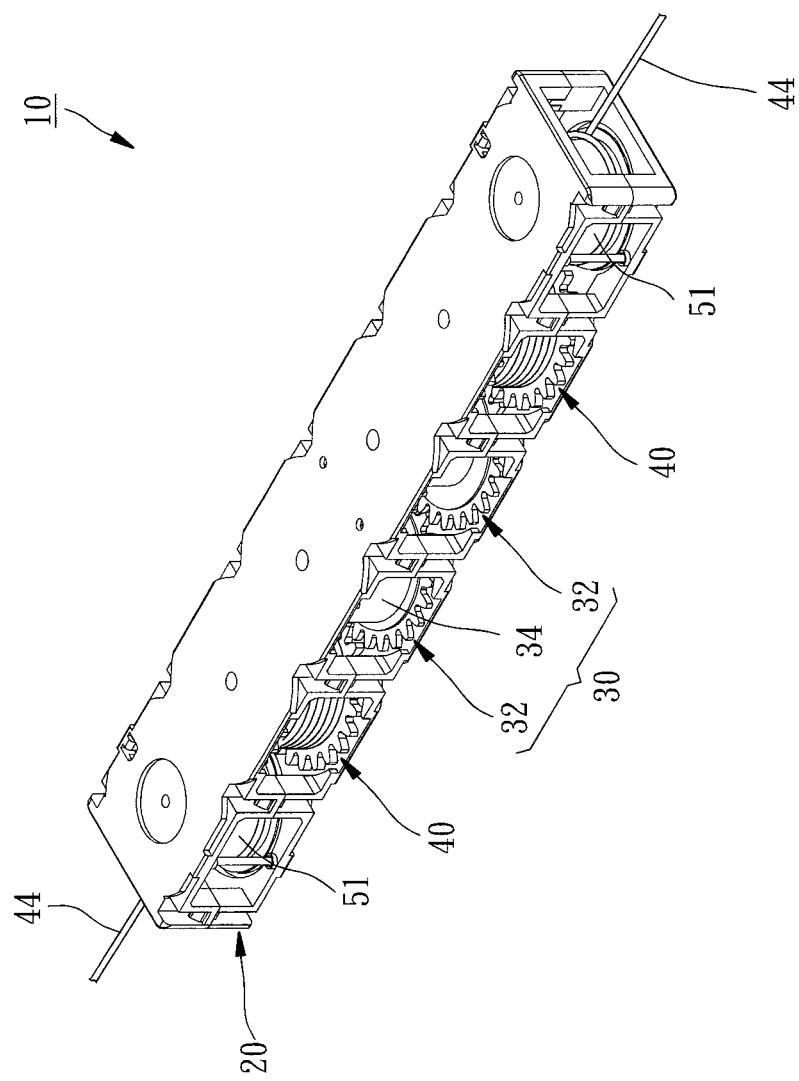
FIG. 1 is an assembled perspective view of a one-way driving mechanism according to the present invention.
Figure 2:
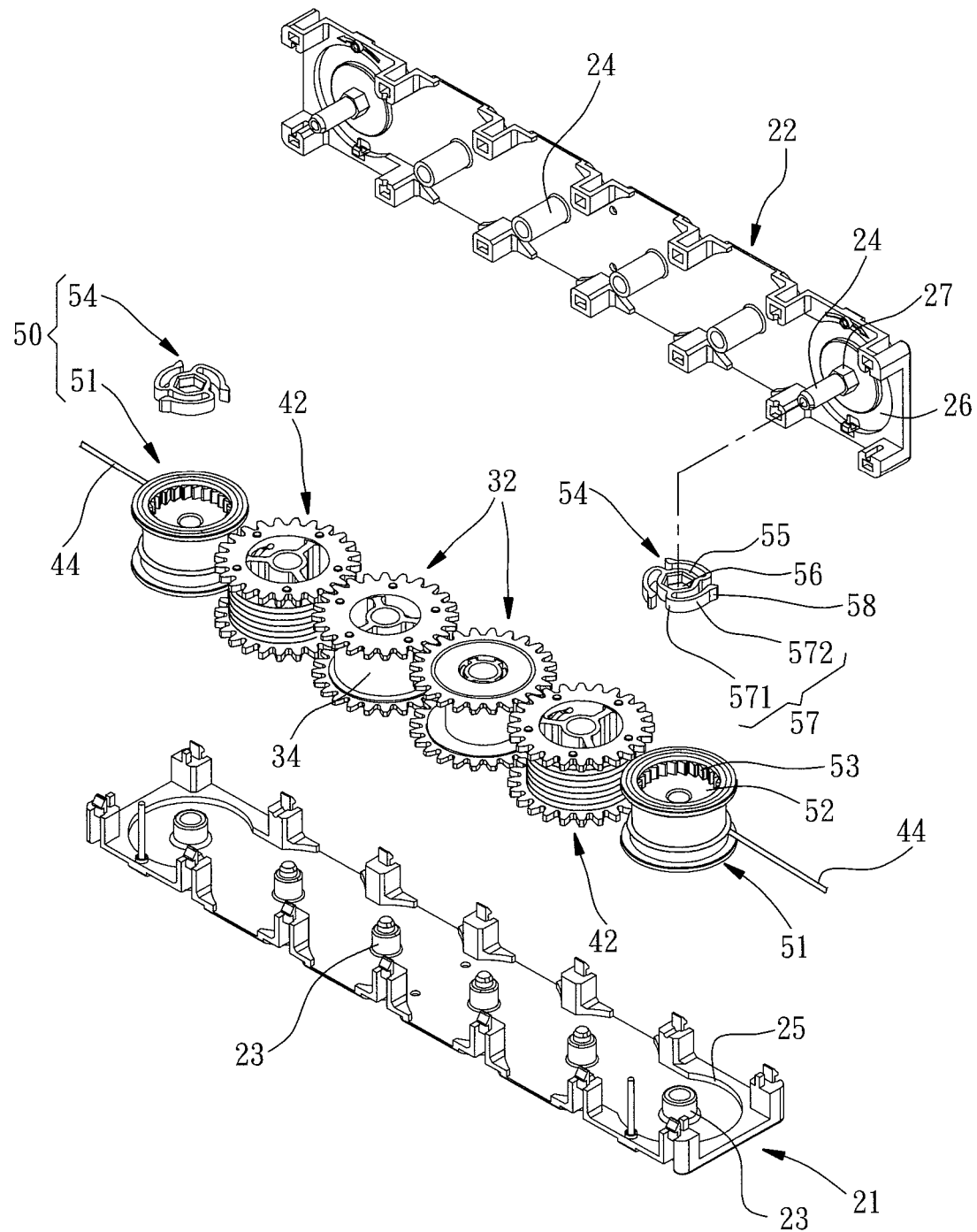
FIG. 2 is a partially exploded perspective view of the one-way driving mechanism.

Referring to FIG. 1 and FIG. 2, the one-way driving mechanism 10 according to an embodiment of the present invention includes a casing 20, a reeling unit 30, two cord units 40, and two one-way clutch units 50.

The casing 20 is configured to be mounted in a headrail 12 and has a bottom plate 21 and a top plate 22 covering the bottom plate 21. The bottom plate 21 has six lower posts 23 on its top side while and the top plate 22 has six upper posts 24 on its bottom side. Each of the upper posts 24 corresponds to and is connected with one of the lower posts 23. The top side of the bottom plate 21 has two lower position-limiting grooves 25 that are spacedly arranged, and the bottom side of the top plate 22 has two upper position-limiting grooves 26 that are spacedly arranged. The upper position-limiting grooves 26 correspond to the lower position-limiting grooves 25 respectively. In addition, the bottom side of the top plate 22 has two polygonal projections 27. More specifically, the two polygonal projections 27 are located in the upper position-limiting grooves 26 respectively and are each connected to the corresponding upper posts 24 respectively.

The reeling unit 30 has two volute spring gears 32 and a volute spring 34. The volute spring gears 32 are respectively and rotatably mounted around the two corresponding pairs of upper and lower posts 24, 23 of the casing 20 and meshed with each other. The volute spring 34 is connected to the two volute spring gears 32 and can be wound around one of the two volute spring gears 32 in response to relative rotation of the volute spring gears 32.

Each of the cord units 40 has a cord gear 42 and a cord 44. The cord gears 42 are respectively and rotatably mounted around the two corresponding pairs of upper and lower posts 24, 23 of the casing 20 and meshed with the volute spring gears 32 respectively so that each of the cord gears 42 can synchronously rotate along with the corresponding volute spring gear 32 which it meshes. Each of the cords 44 is provided with two ends for connecting one of the bottom rails 14 and tone of the cord gears 42 respectively so that each of the cords 44 can be wound around or unwound around the corresponding cord gear 42 by the rotation of the corresponding cord gears 42.

Figure 3:
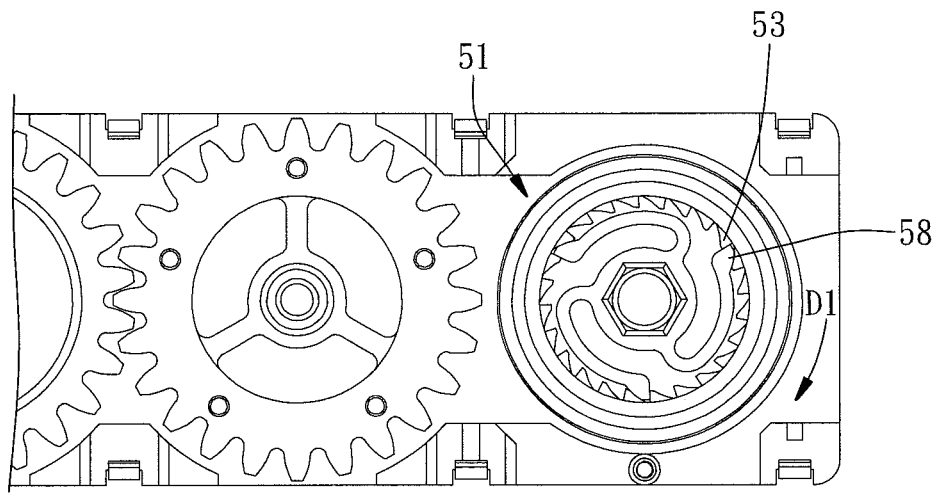
FIG. 3 is a partial top view of the one-way driving mechanism, showing in particular a clutch wheel rotating in a first direction.
Figure 4:
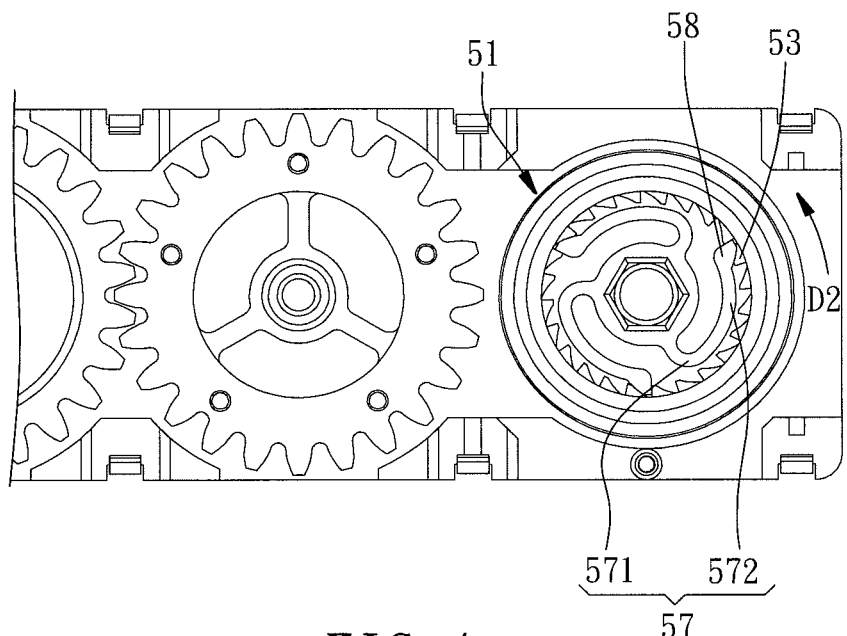
FIG. 4 is similar to FIG. 3 and shows the clutch wheel rotating in a second direction.

Each of the one-way clutch units 50 has a clutch wheel 51 and a position-securing member 54. The clutch wheels 51 are respectively and rotatably disposed in the corresponding pair of upper and lower position-limiting grooves 26, 25 of the casing 20, and each of the clutch wheels 51 is encircled with a single loop by the corresponding cord 44. Moreover, the clutch wheel 51 is hollow in shape and the top end of each clutch wheel 51 has a receiving groove 52 and an internally toothed peripheral portion 53 on the groove wall of the receiving groove 52. Each of the position-securing members 54 is provided in the receiving groove 52 of the corresponding clutch wheel 51 and has a position-securing portion 55 and a polygonal hole 56 penetrating the position-securing portion 55. Each of the position-securing members 54 is engaged with the corresponding polygonal projection 27 of the top plate 22 of the casing 20 by the polygonal hole 56 to keep the position-securing members 54 in a fixed, non-rotatable state. Besides, each of the position-securing members 54 has three elastic arms 57, which are arranged in a manner of rotational symmetry with respect to the corresponding polygonal hole 56. Each of elastic arms 57 has a first curved section 571 and a second curved section 572. The first curved section 571 has a greater curvature than the second curved section 572. The first curved section 571 is provided with two ends for connecting the position-securing portion 55 and the second curved section 572 respectively, and the second curved section 572 has an end opposite to the first curved section 571 and connected to one of the ratchet tooth 58. Each of the position-securing member 54 have a one-way meshing relationship with the internally toothed peripheral portion 53 of the corresponding clutch wheel 51 by the corresponding ratchet teeth 58. More specifically, when each of the clutch wheels 51 is rotated in a first direction D1 as shown in FIG. 3, the internally toothed peripheral portion 53 of the clutch wheel 51 meshes with the ratchet teeth 58 of the corresponding position-securing member 54 to prevent the clutch wheel 51 from further rotation in the same direction. When each of the clutch wheels 51 is rotated in a second direction D2 as shown in FIG. 4, the elastic arms 57 of the corresponding position-securing member 54 are elastically deformed because the internally toothed peripheral portion 53 of the clutch wheel 51 pushes the ratchet teeth 58 of the corresponding position-securing member 54; consequently, the internally toothed peripheral portion 53 of the clutch wheel 51 does not mesh with the ratchet teeth 58 of the corresponding position-securing member 54 but allows the clutch wheel 51 to rotate freely with respect to the corresponding position-securing member 54.

Figure 5:
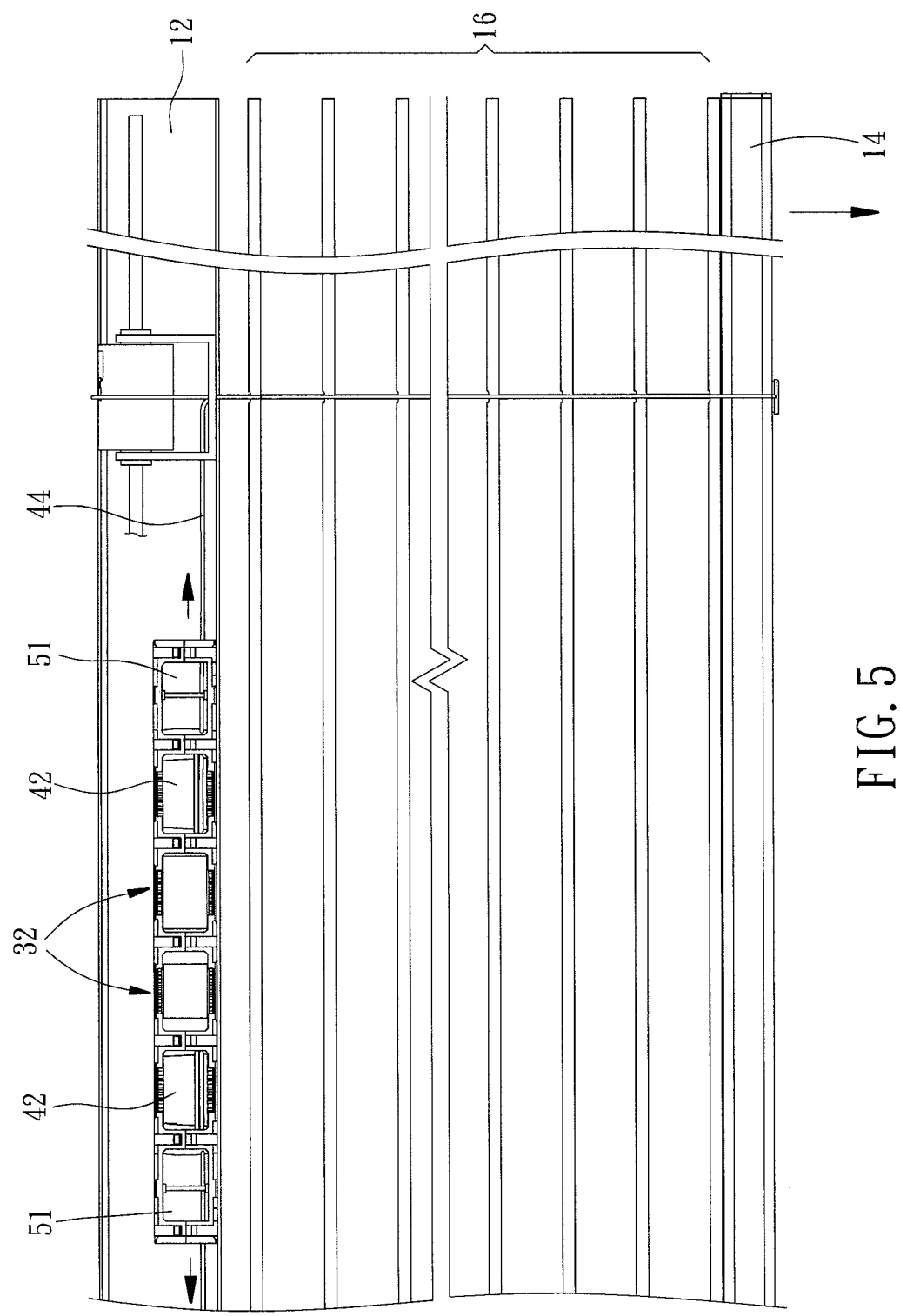
FIG. 5 is a side view of the present invention, showing that the one-way driving mechanism in FIG. 1 is applied to a window blind, and the slats are lowered.

To expand slats 16 of the window blind provided between the headrail 12 and the bottom rail 14 as shown in FIG. 5. Firstly, pull the bottom rail 14 downward so that the cords 44 are pulled by the bottom rail 14 and therefore gradually unwound around the cord gears 42 respectively. In the course in which the cords 44 are pulled by the bottom rail 14, the clutch wheels 51 are rotated in the second direction D2 as shown in FIG. 4, and the cord gears 42 are also rotated. Each of the cord gears 42, in turn, rotates the volute spring gear 32 with which it meshes. As the two volute spring gears 32 rotate with respect to each other, the volute spring 34 accumulates an elastic restoring force. Once the slats 16 are expanded to a desired position, the pulling force applied to the bottom rail 14 is released such that the volute spring gears 32 are driven by the elastic restoring force of the volute spring 34 to rotate the cord gears 42 reversely. During reverse rotation of the cord gears 42, the cords 44 are reeled in slightly so as to rotate the clutch wheels 51 respectively in the first direction D1 as shown in FIG. 3. However, once the internally toothed peripheral portions 53 of the rotating clutch wheels 51 start to mesh with the ratchet teeth 58 of the position-securing members 54 respectively, the clutch wheels 51 are stopped from rotating. In the meantime, the cords 44 are subjected to resistance generated by friction from the corresponding clutch wheels 51 and therefore can no longer be reeled in by the cord gears 42 respectively. As a result, the volute spring gears 32 and the cord gears 42 stop rotating, and the expanded slats 16 are secured in position.

Figure 6:
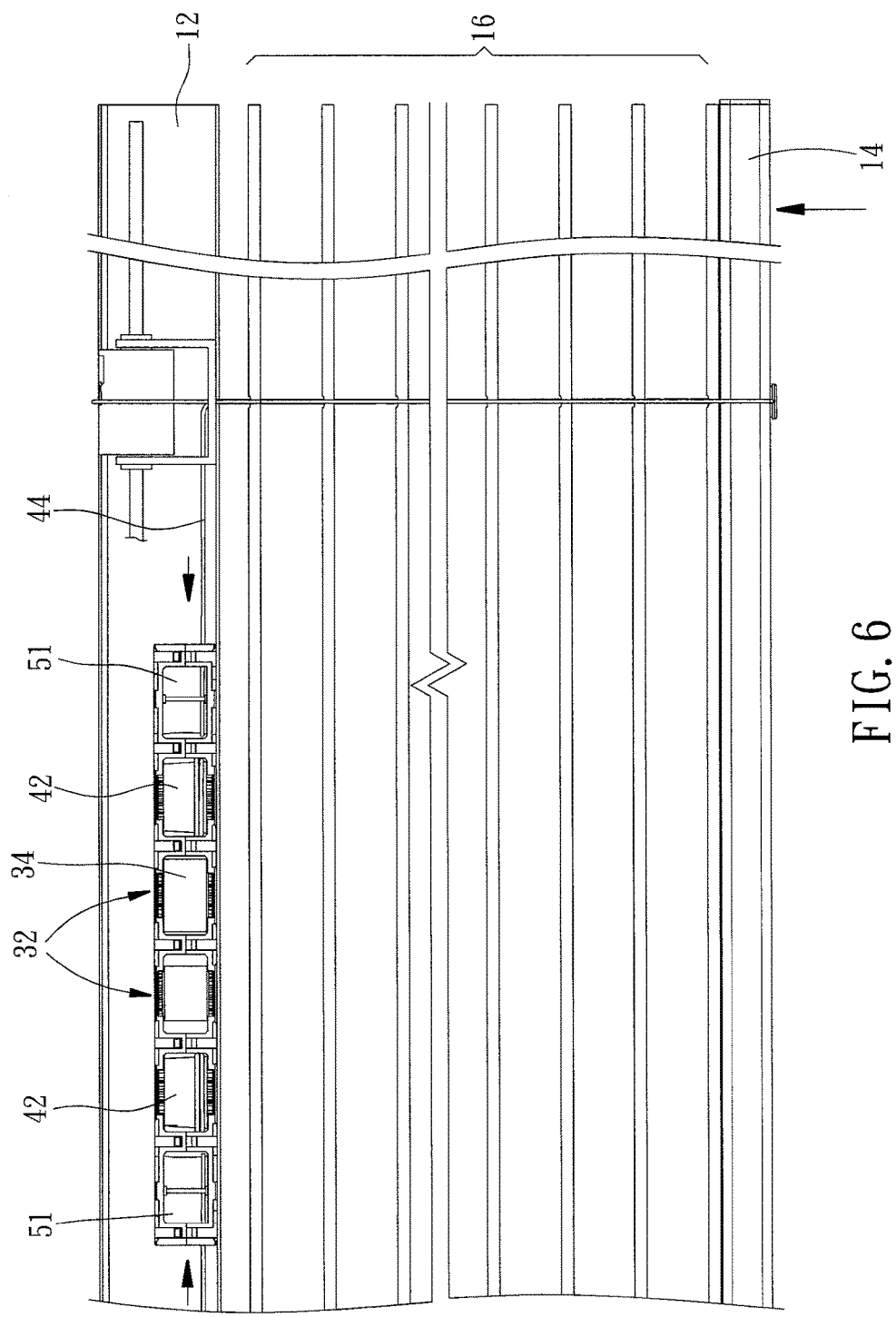
FIG. 6 is similar to FIG. 5 and shows that the slats are raised.

To raise the slats 16, the user needs to exert force to push upward the bottom rail 14 to slacken the cords 44, thereby reducing the friction between the cords 44 and the corresponding clutch wheels 51 as shown in FIG. 6. With the assistance of the pushing force, the volute spring 34 rotates both volute spring gears 32 reversely, and each reverse rotating of the volute spring gears 32 rotate the cord gears 42 with which they meshes. The rotating of the cord gears 42 reels in the cords 44 respectively. Once the slats 16 are raised to a desired position, the user release the pushing force applied to the bottom rail 14, in such a way that the cords 44 rewind tightly around the corresponding clutch wheels 51 respectively. As the internally toothed peripheral portion 53 of each clutch wheel 51 still meshes with the ratchet teeth 58 of the corresponding position-securing member 54, the friction generated from the corresponding clutch wheel 51 keeps the cords 44 from being reeled in by the cord gears 42 respectively. In consequence, the volute spring gears 32 and the cord gears 42 stop rotating, and the slats 16 are secured at a raised position.

According to the above, the one-way driving mechanism 10 can secure the slats 16 in position with the one-way clutch units 50, having a simple structural configuration as a whole, and can be operated stably and smoothly to provide a better driving effect.

What is claimed is:

1. A one-way driving mechanism for a cordless window blind, comprising:
   a casing;
   a reeling unit having two volute spring gears and a volute spring, the two volute spring gears being rotatably provided in the casing and meshed with each other, the volute spring being connected with the two volute spring gears and capable of being wound around one of the two volute spring gears;
   two cord units each having a cord gear and a cord, each of the two cord gears being rotatably provided in the casing and meshed with one of the volute spring gears respectively, each of the cords having one end connected to a corresponding the cord gear in such a way that each of the cords is capable of being wound around or unwound around the corresponding cord gear by the rotating of the corresponding cord gear; and
   two one-way clutch units each having a clutch wheel and a position-securing member, each of the two clutch wheels being rotatably provided in the casing and encircled with a single loop by a corresponding one of the cords, each of the clutch wheels being hollow in shape and having an internally toothed peripheral portion, each of the position-securing members being fixedly provided in the casing and having at least one elastic arm and at least one ratchet tooth, which is connected with the at least one elastic arm and has a one-way meshing relationship with the internally toothed peripheral portion of a corresponding one of the clutch wheels.

2. The one-way driving mechanism of claim 1, wherein the casing has two polygonal projections; each of the clutch wheels has a receiving groove, which is provided with a groove wall for mounting a corresponding one of the internally toothed peripheral portions; each of the position-securing members is disposed in one of the receiving grooves respectively; each of the position-securing members further has a position-securing portion and a polygonal hole provided in the position-securing portion; each of the position-securing members is engaged with one of the polygonal projections of the casing by the polygonal holes respectively; each of the at least one elastic arm is provided with two ends for connecting the position-securing portion and the at least one ratchet tooth respectively.

3. The one-way driving mechanism of claim 2, wherein each of the elastic arms of the position-securing member has a first curved section and a second curved section; the first curved section has a first curved length and a first radius of curvature, and the second curved section has a second curved length and a second radius of curvature; the first curved length is smaller than the second curved length, and the first radius of curvature is smaller than the second radius of curvature; the first curved section is provided with two ends for connecting the corresponding position-securing portion and the second curved section respectively, and the second curved section has an end opposite to the first curved section and connected to the ratchet tooth.

4. The one-way driving mechanism of claim 2, wherein each of the position-securing members has three of the elastic arms and three of the ratchet teeth; the three elastic arms are arranged in a manner of rotational symmetry about the polygonal hole of the position-securing member, each of the three ratchet teeth is connected to one of the corresponding elastic arms.

5. The one-way driving mechanism of claim 1, wherein the casing has a bottom plate and a top plate covering the bottom plate; the bottom plate has two lower position-limiting grooves, which are spaced arranged on a top side of the bottom plate, and the top plate has two upper position-limiting grooves, which are spaced arranged on a bottom side of the top plate; each of the clutch wheels is rotatably disposed in a corresponding the upper position-limiting groove of the top plate and a corresponding the lower position-limiting groove of the bottom plate.

* * * * *